(12) United States Patent
Yoshimura et al.

(10) Patent No.: US 11,766,754 B2
(45) Date of Patent: Sep. 26, 2023

(54) CONVEYANCE APPARATUS

(71) Applicant: AISIN CORPORATION, Kariya (JP)

(72) Inventors: Yuichiro Yoshimura, Anjo (JP); Atsushi Kohama, Anjo (JP); Atsushi Yoshida, Anjo (JP); Makoto Iida, Okazaki (JP); Syuntaro Nagai, Okazaki (JP)

(73) Assignee: AISIN CORPORATION, Kariya (JP)

( * ) Notice: Subject to any disclaimer, the term of this patent is extended or adjusted under 35 U.S.C. 154(b) by 1087 days.

(21) Appl. No.: 16/483,471

(22) PCT Filed: Mar. 27, 2018

(86) PCT No.: PCT/JP2018/012464
§ 371 (c)(1),
(2) Date: Aug. 5, 2019

(87) PCT Pub. No.: WO2018/181333
PCT Pub. Date: Oct. 4, 2018

(65) Prior Publication Data
US 2020/0016710 A1    Jan. 16, 2020

(30) Foreign Application Priority Data
Mar. 28, 2017   (JP) .................. 2017-063492

(51) Int. Cl.
*B23Q 7/04*     (2006.01)
*B23Q 3/18*     (2006.01)
*B25J 13/08*    (2006.01)
*B25J 15/00*    (2006.01)
*B65G 25/04*    (2006.01)

(52) U.S. Cl.
CPC ............ *B23Q 7/046* (2013.01); *B23Q 3/18* (2013.01); *B25J 13/08* (2013.01); *B25J 15/009* (2013.01); *B65G 25/04* (2013.01)

(58) Field of Classification Search
CPC . B23Q 1/62; B23Q 1/621; B23Q 3/00; B23Q 7/04–048; B23Q 7/1494; B23Q 39/048; B25J 9/0084; B25J 9/0096
See application file for complete search history.

(56) References Cited

FOREIGN PATENT DOCUMENTS

| JP | 53-013767 A | 2/1978 |
|----|----|----|
| JP | 58-181483 U | 12/1983 |

(Continued)

OTHER PUBLICATIONS

Machine Translation of JP2002096230A. Espacenet. https://worldwide.espacenet.com/ (Year: 2023).*

(Continued)

*Primary Examiner* — Tyrone V Hall, Jr.
(74) *Attorney, Agent, or Firm* — Sughrue Mion, PLLC (57) ABSTRACT

A conveyance apparatus includes two clamp mechanisms. Each of the clamp mechanisms is configured to freely change its state among a fully clamping state, a semi-clamping state, and a non-clamping state. When an object is delivered from a first clamp mechanism that is holding the object to a second clamp mechanism, the second clamp mechanism is brought into the semi-clamping state to temporarily hold the object. Then, the first clamp mechanism is brought into the non-clamping state and the second clamp mechanism is brought into the fully clamping state.

5 Claims, 6 Drawing Sheets

(56) References Cited

FOREIGN PATENT DOCUMENTS

| | | |
|---|---|---|
| JP | 05-056302 U | 7/1993 |
| JP | 07-251305 A | 10/1995 |
| JP | 2002-096230 A | 4/2002 |
| JP | 2012-020380 A | 2/2012 |

OTHER PUBLICATIONS

Machine Translation of JPH0556302U. Espacenet. https://worldwide.espacenet.com/ (Year: 2023).*
International Search Report for PCT/JP2018/012464 dated May 29, 2018 (PCT/ISA/210).

* cited by examiner

CONVEYANCE APPARATUS

CROSS REFERENCE TO RELATED APPLICATIONS

This application is a National Stage of International Application No. PCT/JP2018/012464 filed Mar. 27, 2018, claiming priority based on Japanese Patent Application No. 2017-063492 filed Mar. 28, 2017.

TECHNICAL FIELD

The aspects of the present disclosure relate to a conveyance apparatus.

BACKGROUND ART

A machining apparatus is used for machining an object. This machining apparatus may employ a conveyance apparatus that includes two clamp mechanisms configured to move relative to each other along a reference direction, and is configured to convey the object in the reference direction by transferring the object between the two clamp mechanisms. Japanese Patent Application Publication No. 2012-20380 (JP 2012-20380 A) (Patent Document 1) discloses an example of the machining apparatus including the conveyance apparatus.

In the machining apparatus of Patent Document 1, each of the two clamp mechanisms [chuck device portions 15, 25] has three chucking claws capable of centering the object [workpiece W], and is configured to transfer the object while the two clamp mechanisms face each other in the reference direction [X-axis direction]. To transfer the object, the second clamp mechanism holds the object from an opposite side in the reference direction while the first clamp mechanism is holding the object, and then the second clamp mechanism moves to a machining position together with the object after the first clamp mechanism terminates the state in which the object is held.

However, if the second clamp mechanism moves away from the first clamp mechanism while the two clamp mechanisms are simultaneously and firmly holding the object before the first clamp mechanism terminates the state in which the object is held, the object may be damaged because the object is pulled in both directions. That is, the object may be damaged if the timings when one clamp mechanism terminates the holding and the other clamp mechanism moves away from the one clamp mechanism are inappropriate during the transfer of the object between the two clamp mechanisms.

RELATED ART DOCUMENTS

Patent Documents

Patent Document 1: Japanese Patent Application Publication No. 2012-20380 (JP 2012-20380 A)

SUMMARY OF THE DISCLOSURE

Problem to be Solved by the Various Aspects of the Disclosure

There is a demand that damage to an object can be reduced even if a timing when one clamp mechanism terminates holding deviates from a timing when the other clamp mechanism moves away from the one clamp mechanism during transfer of the object between the two clamp mechanisms.

Means for Solving the Problem

A conveyance apparatus disclosed herein is a conveyance apparatus configured to convey an object in a reference direction by transferring the object between two clamp mechanisms configured to move relative to each other along the reference direction.

Each of the clamp mechanisms is configured to freely change its state among a fully clamping state in which the object is held by a tightening force equal to or greater than a set tightening force, a semi-clamping state in which the object is held by a tightening force smaller than the set tightening force, and a non-clamping state in which the object is not held.

When the object is delivered from a first clamp mechanism that is one of the clamp mechanisms to a second clamp mechanism that is the other one of the clamp mechanisms, the second clamp mechanism is brought into the semi-clamping state to temporarily hold the object from a condition that the first clamp mechanism is holding the object in the fully clamping state and the second clamp mechanism is in the non-clamping state, and then the first clamp mechanism is brought into the non-clamping state and the second clamp mechanism is brought into the fully clamping state.

According to this structure, each of the clamp mechanisms is configured to freely change its state among the three states including the semi-clamping state as well as the fully clamping state and the non-clamping state. By using the semi-clamping state, when the object is transferred between the two clamp mechanisms, the second clamp mechanism is brought into the semi-clamping state to temporarily hold the object before the second clamp mechanism is brought into the fully clamping state to fully hold the object. Therefore, even if the second clamp mechanism moves away from the first clamp mechanism before the first clamp mechanism terminates the state in which the object is held, the second clamp mechanism only terminates the temporary holding of the object, and the object is not pulled in both directions. Thus, damage to the object can be reduced. Then, the first clamp mechanism is brought into the non-clamping state to terminate the holding, and the second clamp mechanism is brought into the fully clamping state to fully hold the object. Thus, the object can firmly be held by the second clamp mechanism.

Further features and advantages of the technology disclosed herein will become more apparent from the following description of illustrative and non-limiting embodiments with reference to the drawings.

DETAILED DESCRIPTION

An embodiment of a conveyance apparatus is described with reference to the drawings. This embodiment is described taking an exemplary conveyance apparatus 5 mounted in a machining apparatus 1 configured to machine an object W. The machining apparatus 1 of this embodiment includes a plurality of machining mechanisms 2 to 4 that hold tools T, thereby being capable of machining the object W variously. A plurality of clamp mechanisms 6 and 7 provided in the conveyance apparatus 5 convey the object W while transferring the object W, thereby being capable of achieving multifaceted machining for the object W. Details of the machining apparatus 1 and the conveyance apparatus 5 are described below.

In the following description, a direction parallel to rotation axes (main spindles) of rotational drive portions of the machining mechanisms 2 to 4 is defined as a "Z-axis direction". A direction in which the machining mechanisms 2 to 4 and the clamp mechanisms 6 and 7 are arrayed is defined as an "X-axis direction". A direction orthogonal to both the X-axis direction and the Z-axis direction is defined as a "Y-axis direction". In this embodiment, the X-axis direction corresponds to a "reference direction".

Figure 1:
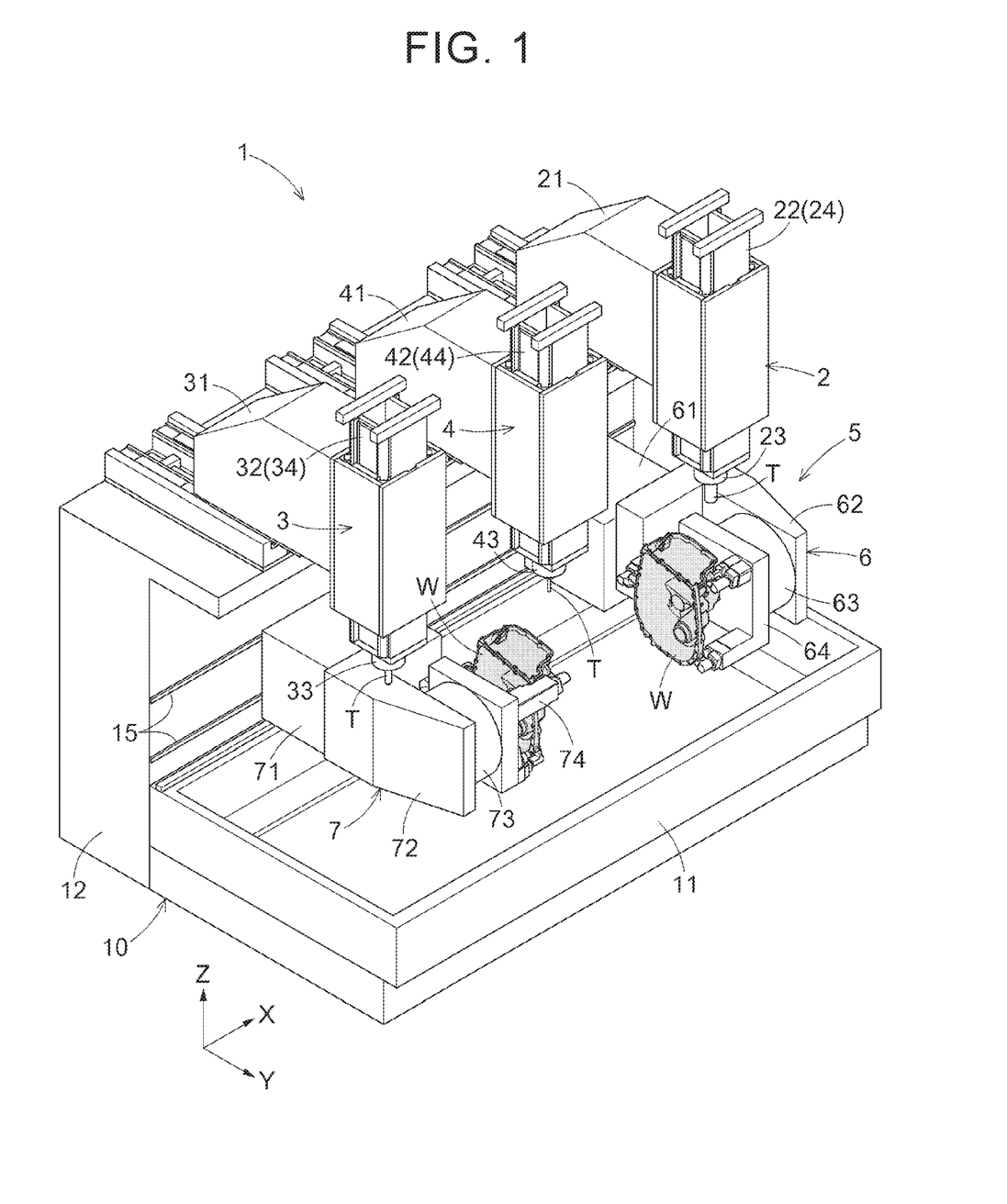
FIG. 1 is an overall perspective view of a machining apparatus including a conveyance apparatus of an embodiment.

As illustrated in FIG. 1, the machining apparatus 1 includes three machining mechanisms that are a first machining mechanism 2, a second machining mechanism 3, and a third machining mechanism 4, and two clamp mechanisms that are a first clamp mechanism 6 and a second clamp mechanism 7. Those mechanisms are supported on a frame (apparatus frame) 10. The frame 10 includes a bed portion 11 serving as a base for supporting the entire apparatus, and a column portion 12 serving as a support portion for the machining mechanisms 2, 3, and 4.

The machining apparatus 1 further includes a control portion (not illustrated) configured to control operations of the first machining mechanism 2, the second machining mechanism 3, the third machining mechanism 4, the first clamp mechanism 6, and the second clamp mechanism 7. For example, the control portion is structured by a microcomputer or a workstation that stores a machining program. For example, the control portion can control the operations of the respective portions described above by NC (Numerical Control).

The first machining mechanism 2 includes a first Y-axis moving portion 21, a first Z-axis moving portion 22, a first tool holding portion 23, and a first drive portion 24. The first Y-axis moving portion 21 is reciprocally movable along the Y-axis direction. The first Z-axis moving portion 22 is reciprocally movable along the Z-axis direction. The first tool holding portion 23 holds the tool T for machining the object W. Examples of the tool T include a plain milling cutter, a drill, a boring tool, a boring bar, a reamer, a tap, an end mill, a face milling cutter, and various other machining tools. The first drive portion 24 rotationally drives the first tool holding portion 23. By driving the first drive portion 24, the tool T held by the first tool holding portion 23 is rotationally driven at high speed about the rotation axis (main spindle) parallel to the Z-axis direction.

The first machining mechanism 2 of this embodiment is a machining apparatus of a milling machine type (or a drilling machine type). The machining apparatus 1 structured as described above has an advantage in that not only a cylindrical object W but also various other objects W having complex shapes, such as an irregularly shaped case of a vehicle drive apparatus, can be machined. Further, irregular machining can be performed in a circumferential direction about the Z-axis direction. For example, if the object W is a case of the vehicle drive apparatus, an oil passage extending in a radial direction can be formed in an end wall or an intermediate wall of the case by grooving.

The second machining mechanism 3 and the third machining mechanism 4 have structures similar to that of the first machining mechanism 2. The second machining mechanism 3 includes a second Y-axis moving portion 31, a second Z-axis moving portion 32, a second tool holding portion 33, and a second drive portion 34. The third machining mechanism 4 includes a third Y-axis moving portion 41, a third Z-axis moving portion 42, a third tool holding portion 43, and a third drive portion 44. The structures, functions, and the like of those portions may be regarded as being similar to those of the corresponding portions of the first machining mechanism 2. Therefore, detailed description is omitted herein.

The first clamp mechanism 6 includes a first X-axis moving portion 61, a first B-axis rotary portion 62, a first C-axis rotary portion 63, and a first clamp portion 64. The first X-axis moving portion 61 is reciprocally movable along the X-axis direction. The entire first B-axis rotary portion 62 is formed into an L-shape. The first B-axis rotary portion 62 is supported by the first X-axis moving portion 61 so as to be rotatable about a B-axis parallel to the Y-axis direction (see FIG. 2). The first C-axis rotary portion 63 is supported by the first B-axis rotary portion 62 so as to be rotatable about a C-axis orthogonal to the Y-axis direction (see FIG. 2). The first clamp portion 64 is fixed to the first C-axis rotary portion 63.

Figure 2:
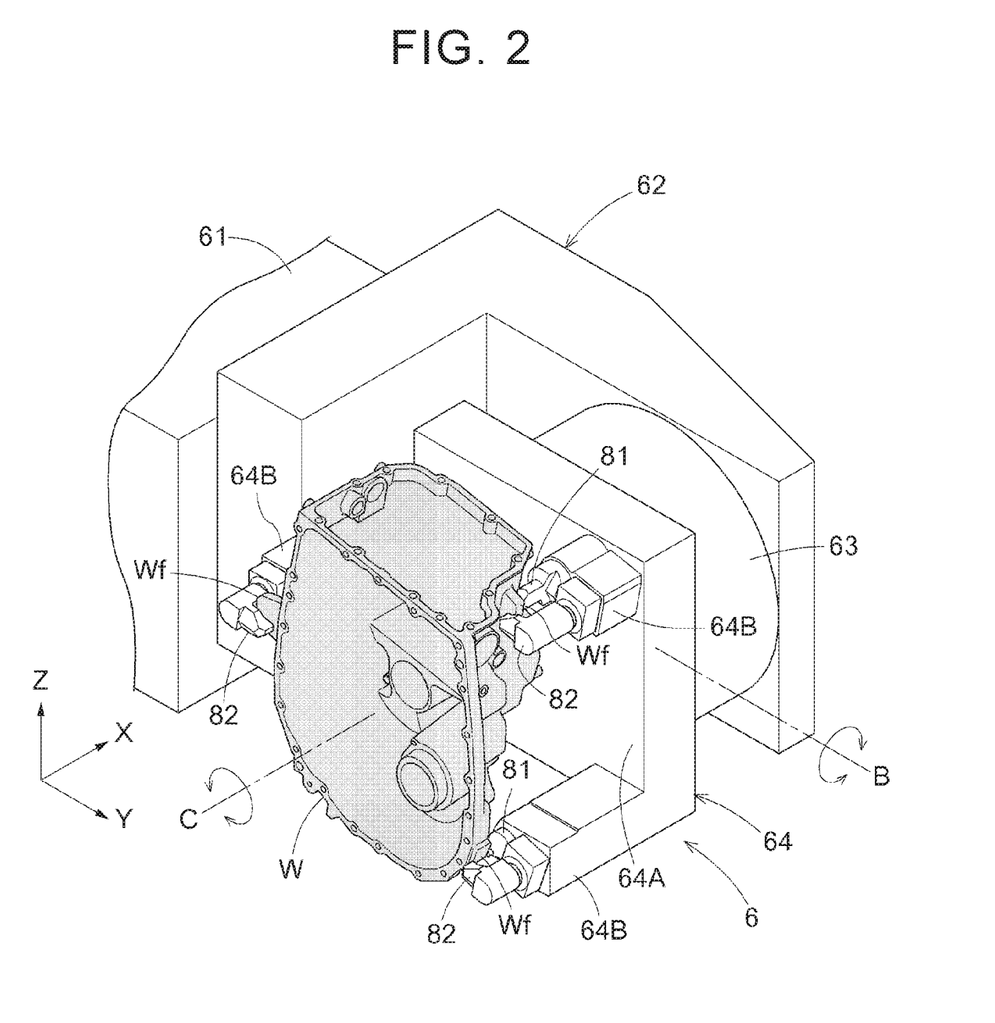
FIG. 2 is an enlarged perspective view of a clamp mechanism.

The first clamp portion 64 holds the object W that is an object to be machined by the machining apparatus 1. For example, the object W of this embodiment may be a casting typified by the case of the vehicle drive apparatus, and may have a non-cylindrical (for example, irregularly tubular) external shape. In order that the first clamp portion 64 of this embodiment can also hold the object W having the non-cylindrical external shape, the first clamp portion 64 has a base 64A and a plurality of (preferably three or more) clamp arms 64B as illustrated in FIG. 2. In this embodiment, the three clamp arms 64B are formed so as to protrude from the base 64A. The three clamp arms 64B are provided at positions distributed along the outer edge of the base 64A. The protrusion heights of the three clamp arms 64B may be equal to or different from each other.

As illustrated in FIG. 2, the first clamp portion 64 has support claws 81 and movable claws 82. The support claw 81 supports the object W. The support claw 81 has a support body 81A and a protruding pin 81B that protrudes from the distal end of the support body 81A (see FIG. 7 or the like). For example, if the object W is the case of the vehicle drive apparatus and has a flange portion Wf and if a hole Wh such as a bolt hole is formed in the flange portion Wf, the protruding pin 81B is inserted into the hole Wh. Thus, the object W can be positioned appropriately. The protruding pin 81B has a tapered surface whose diameter gradually decreases with increasing proximity to the distal end. Even if the object W is displaced in some degree from the first clamp portion 64, the holding position of the object W can finely be adjusted to an appropriate position.

The movable claw 82 is pivotable about the C-axis so that a state in which the movable claw 82 overlaps the support claw 81 when viewed along the C-axis (overlapping state) and a state in which the movable claw 82 does not overlap the support claw 81 (non-overlapping state) are switchable. The movable claw 82 is extensible or contractible along the C-axis when the non-overlapping state and the overlapping state are switched. Specifically, the movable claw 82 is brought into the non-overlapping state while moving away from the support claw 81, and into the overlapping state while moving closer to the support claw 81. In the non-overlapping state, the support claw 81 can newly support the object W, and the movable claw 82 is brought into the overlapping state while the support claw 81 is supporting the object W, thereby clamping the object W between the support claw 81 and the movable claw 82.

Figure 3:
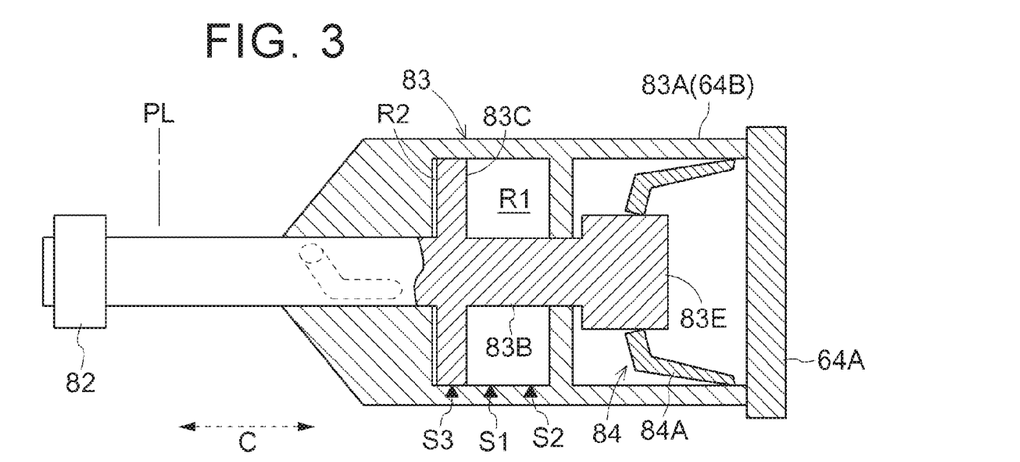
FIG. 3 is a schematic diagram illustrating a non-clamping state.

The first clamp portion 64 has a claw sliding mechanism 83 and a locking mechanism 84 inside each clamp arm 64B (see FIG. 3 or the like). The claw sliding mechanism 83 has a cylinder 83A, a piston rod 83B, and a piston 83C fixed to the piston rod 83B. A body of the clamp arm 64B doubles as the cylinder 83A. The piston rod 83B is arranged through the cylinder 83A. The piston 83C is arranged inside the cylinder 83A. The piston rod 83B and the piston 83C are movable back and forth along the C-axis direction while the radially outer edge of the piston 83C slides against the inner peripheral surface of the cylinder 83A. The movable claw 82 is fixed to the distal end of the piston rod 83B.

A first fluid chamber R1 located on one side (base 64A side) in the C-axis direction with respect to the piston 83C and a second fluid chamber R2 located on the other side (movable claw 82 side) in the C-axis direction with respect to the piston 83C are formed inside the cylinder 83A. Although illustration is omitted in this example, the claw sliding mechanism 83 includes a fluid source and a channel switching portion, and a supply destination of a fluid to be supplied from the fluid source is switchable between the first fluid chamber R1 and the second fluid chamber R2 by switching the state of the channel switching portion. Examples of the fluid to be supplied from the fluid source may include pressure oil and compressed air. The claw sliding mechanism 83 is configured such that a fluid pressure to be supplied to the first fluid chamber R1 and a fluid pressure to be supplied to the second fluid chamber R2 can be adjusted individually.

As illustrated in FIG. 3, in a state in which the fluid is supplied from the fluid source to the first fluid chamber R1, the piston 83C and the piston rod 83B are urged by the fluid pressure so as to move opposite to the base 64A along the C-axis direction. That is, the claw sliding mechanism 83 urges the movable claw 82 fixed to the distal end of the piston rod 83B to a release side by supplying a high-pressure fluid to the first fluid chamber R1. In this case, the object W cannot be clamped between the support claw 81 and the movable claw 82. This state is a "non-clamping state" in which the object W is not held.

Figure 4:
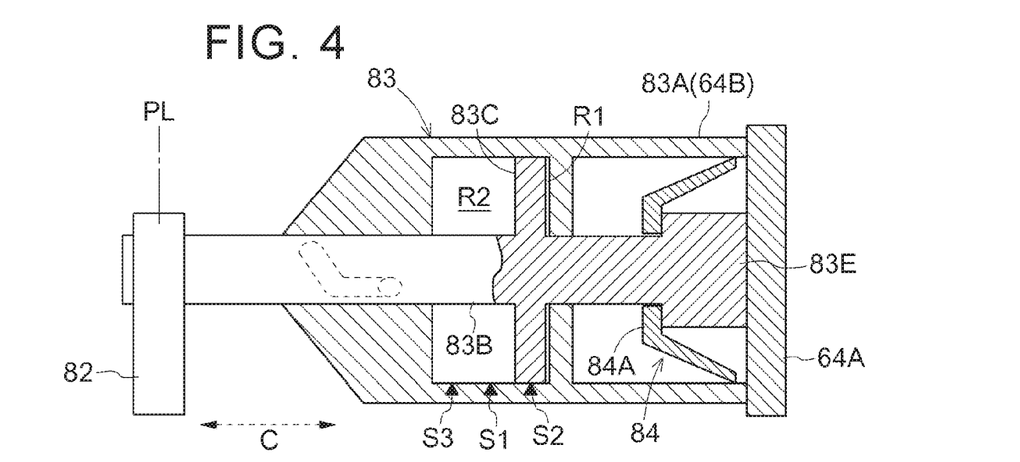
FIG. 4 is a schematic diagram illustrating a fully clamping state.

As illustrated in FIG. 4, in a state in which the fluid is supplied from the fluid source to the second fluid chamber R2, the piston 83C and the piston rod 83B are urged by the fluid pressure so as to move toward the base 64A along the C-axis direction. That is, the claw sliding mechanism 83 urges the movable claw 82 fixed to the distal end of the piston rod 83B to a clamping side by supplying the high-pressure fluid to the second fluid chamber R2. In this case, the object W is firmly clamped between the support claw 81 and the movable claw 82. This state is a "fully clamping state" in which the object W is held by a tightening force equal to or greater than a set tightening force that is determined in advance. For example, the set tightening force is set by being determined experimentally or theoretically in advance as a tightening force by which the object W can firmly be held without causing a backlash steadily when the object W is clamped between the support claw 81 and the movable claw 82. In this embodiment, the claw sliding mechanism 83 capable of urging the movable claw 82 to the clamping side by supplying the high-pressure fluid to the second fluid chamber R2 corresponds to an "urging mechanism".

In this embodiment, a large-diameter portion 83E having a diameter larger than that of the other portion is provided at the end of the piston rod 83B that is opposite to the movable claw 82. The locking mechanism 84 has a locking piece 84A engageable with a recessed corner between the piston rod 83B and the large-diameter portion 83E. In the non-clamping state described above, the distal end of the locking piece 84A slides along the outer peripheral surface of the large-diameter portion 83E, and engages with the recessed corner between the piston rod 83B and the large-diameter portion 83E in conjunction with state transition to the fully clamping state. The locking piece 84A is urged toward the piston rod 83B by a predetermined pressure. This state is a locked state in which the locking mechanism 84 prevents a movement of the movable claw 82 to the release side. That is, the fully clamping state is achieved such that the locking mechanism 84 is actuated into the locked state while the movable claw 82 moves to a predetermined lock position PL through actuation of the claw sliding mechanism 83 to the clamping side. In this embodiment, the fully clamping state is achieved by both the fluid pressure supplied to the second fluid chamber R2 and a mechanical holding force of the locking mechanism 84.

Figure 5:
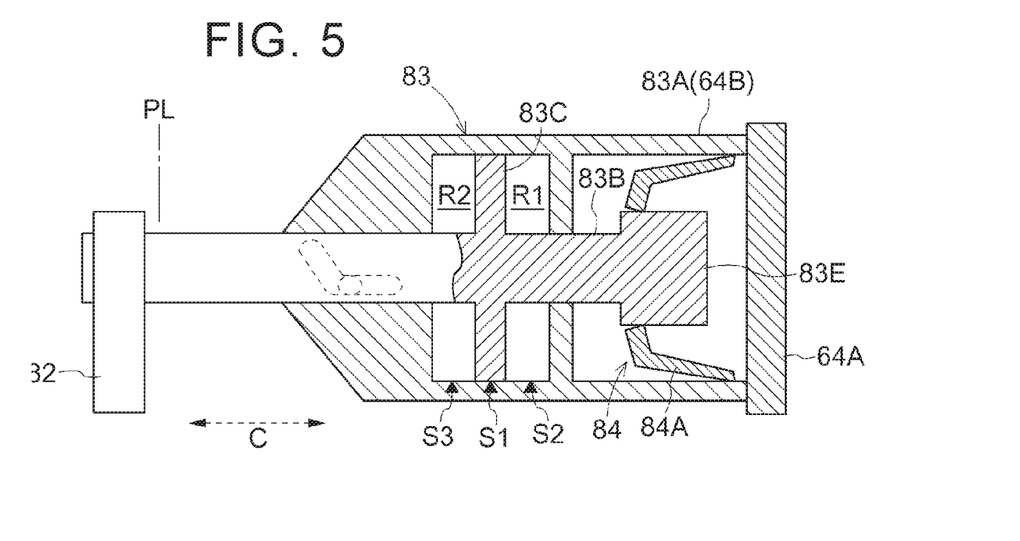
FIG. 5 is a schematic diagram illustrating a semi-clamping state.

In this embodiment, the non-clamping state is not changed immediately to the fully clamping state when the fluid starts to be supplied from the fluid source to the second fluid chamber R2, but can be changed to a "semi-clamping state" in which the object W is held by a tightening force smaller than the set tightening force. In a state in which the fluid pressure on the second fluid chamber R2 side is slightly higher than the fluid pressure on the first fluid chamber R1 side, the piston 83C and the piston rod 83B are urged so as to move toward the base 64A along the C-axis direction within a range in which the movable claw 82 does not reach the lock position PL as illustrated in FIG. 5. Then, the fluid pressures are applied to both the first fluid chamber R1 and the second fluid chamber R2, and the forces applied to the piston 83C are balanced while the object W is clamped between the support claw 81 and the movable claw 82, thereby achieving the semi-clamping state. In the semi-clamping state, the locking mechanism 84 is not actuated. That is, the semi-clamping state is achieved such that the claw sliding mechanism 83 is actuated to the clamping side while the locking mechanism 84 is not actuated.

Thus, the first clamp mechanism 6 is configured to freely change its state among the fully clamping state illustrated in FIG. 4, the semi-clamping state illustrated in FIG. 5, and the non-clamping state illustrated in FIG. 3. When a predetermined fluid pressure is supplied to the second fluid chamber R2, the non-clamping state is changed to the semi-clamping state. When the fluid pressure to the second fluid chamber R2 is further increased, the movable claw 82 moves to the lock position PL, and the locking mechanism 84 is actuated into the locked state, thereby achieving the fully clamping state. When a fluid pressure greater than the mechanical holding force of the locking mechanism 84 is supplied to the first fluid chamber R1, the locking piece 84A is unlocked by disengaging from the recessed corner between the piston rod 83B and the large-diameter portion 83E, thereby changing the fully clamping state to the non-clamping state.

The first clamp mechanism 6 includes three sensors S1 to S3 configured to detect the three states (fully clamping state/semi-clamping state/non-clamping state). The first sensor S1 detects the semi-clamping state. The second sensor S2 detects the fully clamping state. The third sensor S3 detects the non-clamping state. For example, the sensors S1 to S3 may be structured by non-contact position sensors provided on the cylinder 83A and capable of detecting the position of the piston 83C that changes the position in the C-axis direction depending on each state. The specific structure of each of the sensors S1 to S3 is not limited to this structure, but may be an arbitrary structure as long as each state can be detected.

As illustrated in FIG. 1, the second clamp mechanism 7 has a structure similar to that of the first clamp mechanism 6. The second clamp mechanism 7 includes a second X-axis moving portion 71, a second B-axis rotary portion 72, a second C-axis rotary portion 73, and a second clamp portion 74. Further, the second clamp mechanism 7 includes support claws 81, movable claws 82, claw sliding mechanisms 83, locking mechanisms 84, and sensors S1 to S3. The structures, functions, and the like of those portions may be regarded as being similar to those of the corresponding portions of the first clamp mechanism 6. Therefore, detailed description is omitted herein.

The machining apparatus 1 of this embodiment includes the conveyance apparatus 5, and the conveyance apparatus 5 conveys the object W in the X-axis direction by transferring the object W between the two clamp mechanisms 6 and 7 configured to move relative to each other along the X-axis direction. For example, the first machining mechanism 2 or the third machining mechanism 4 performs first machining for the object W while the first clamp mechanism 6 is holding the object W. Then, the conveyance apparatus 5 delivers the object W subjected to the first machining from the first clamp mechanism 6 to the second clamp mechanism 7. At this time, the first clamp mechanism 6 and the second clamp mechanism 7 transfer the object W while the first clamp mechanism 6 and the second clamp mechanism 7 face each other in the X-axis direction. Then, the second machining mechanism 3 or the third machining mechanism 4 performs second machining for the object W subjected to the first machining while the second clamp mechanism 7 is holding the object W. Both front and back faces of the object W can be machined through the first machining and the second machining. The third machining mechanism 4 performs machining in place of the first machining mechanism 2 while the first machining mechanism 2 is replacing the tool T during the first machining, and/or performs machining in place of the second machining mechanism 3 while the second machining mechanism 3 is replacing the tool T during the second machining.

Figure 6:
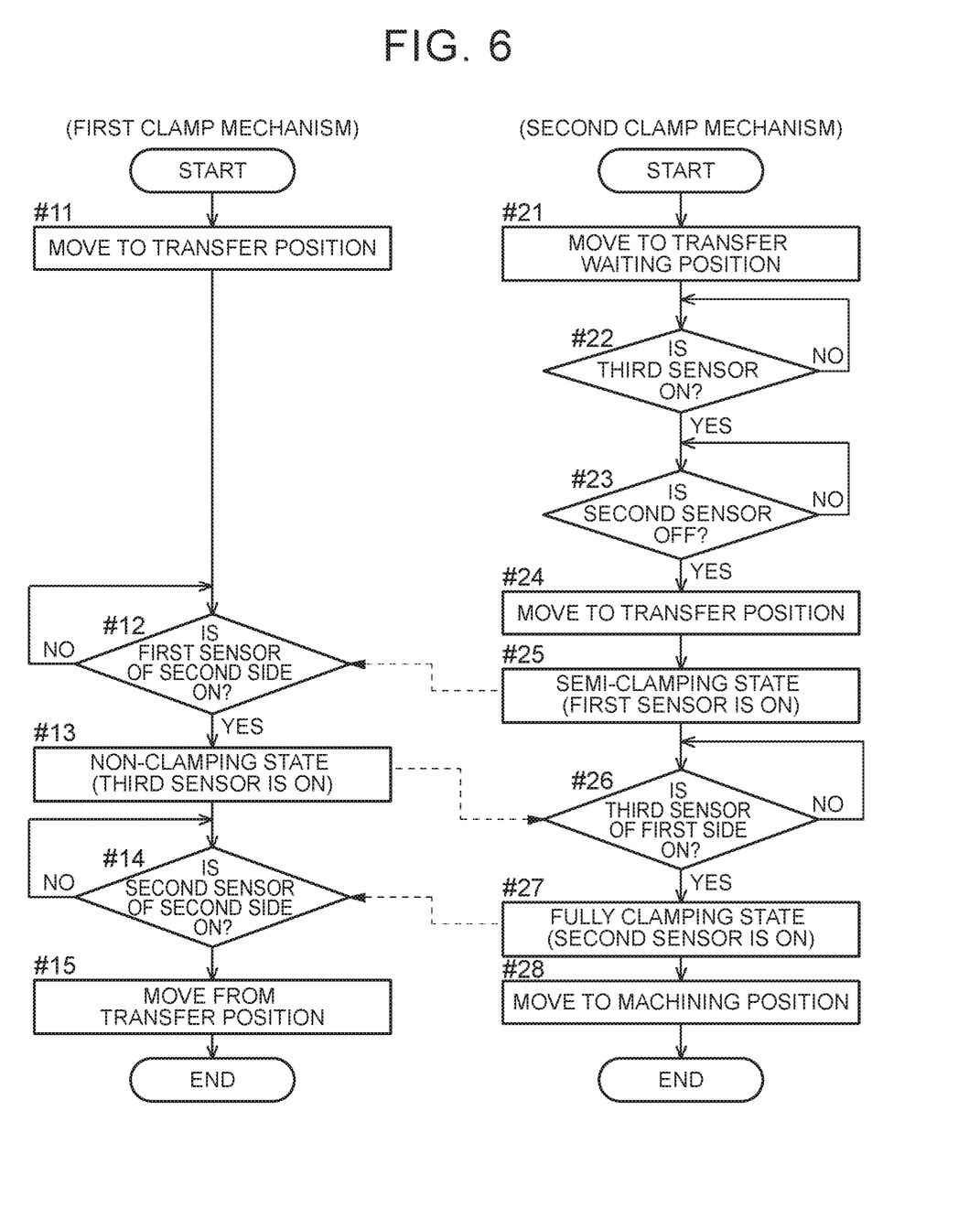
FIG. 6 is a flowchart illustrating a flow of an operation of the clamp mechanisms during transfer of an object.

Operations for delivering the object W from the first clamp mechanism 6 to the second clamp mechanism 7 are described below with reference to a flowchart of FIG. 6. In FIG. 6, a flow of an operation on the first clamp mechanism 6 side is illustrated on a left column, and a flow of an operation on the second clamp mechanism 7 side is illustrated on a right column. Dashed arrows placed between the two right and left columns indicate flows of detection information from the sensors S1 to S3. In this example, a condition that the first clamp mechanism 6 is holding the object W in the fully clamping state is described as an initial condition.

Figure 7:
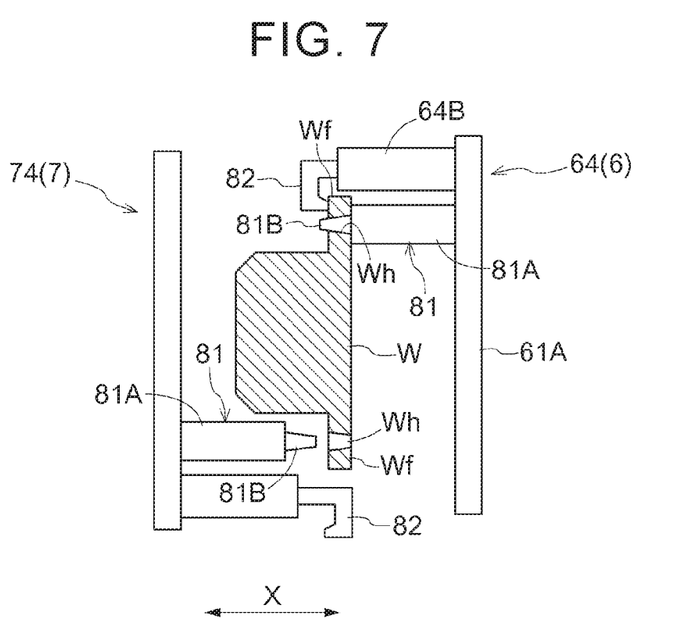
FIG. 7 is a schematic diagram illustrating one phase during the transfer of the object.

First, the first clamp mechanism 6 that is holding the object W in the fully clamping state is moved to a transfer position (Step #11), and the second clamp mechanism 7 in the non-clamping state is moved to a transfer waiting position (#21; see FIG. 7). It is appropriate that the transfer position and the transfer waiting position be set in an area between the first machining mechanism 2 and the second machining mechanism 3 in the X-axis direction (in the vicinity of an area where the third machining mechanism 4 is arranged).

In this state, it is determined whether the third sensor S3 of the second clamp mechanism 7 is ON (#22) and whether the second sensor S2 is OFF (#23). When positive determination results are obtained in both cases (#22: Yes, #23: Yes) to confirm that the second clamp mechanism 7 is reliably in the non-clamping state, the second clamp mechanism 7 is moved to the transfer position (#24). In this example, the second clamp mechanism 7 is moved to the transfer position by being moved closer to the first clamp mechanism 6 (see FIG. 8) while the second sensor S2 of the first clamp mechanism 6 detects the fully clamping state and the third sensor S3 of the second clamp mechanism 7 detects the non-clamping state.

Figure 8:
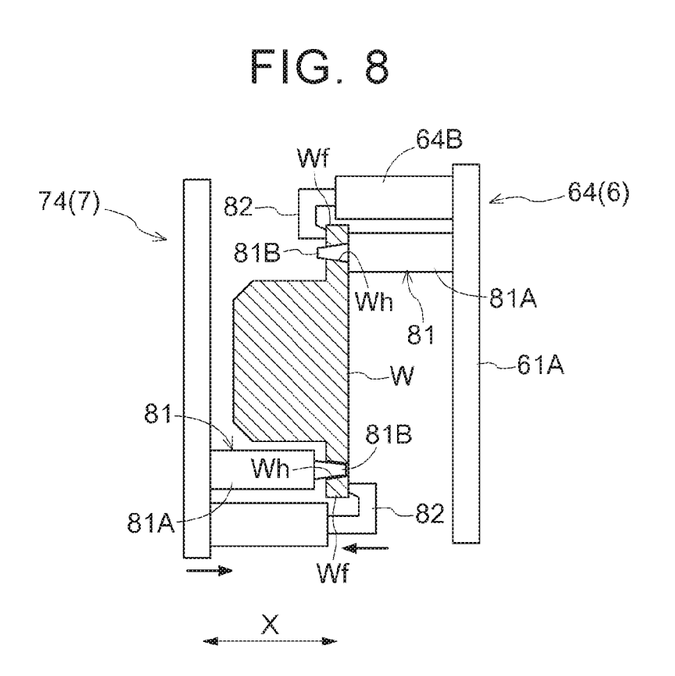
FIG. 8 is a schematic diagram illustrating one phase during the transfer of the object.
Figure 9:
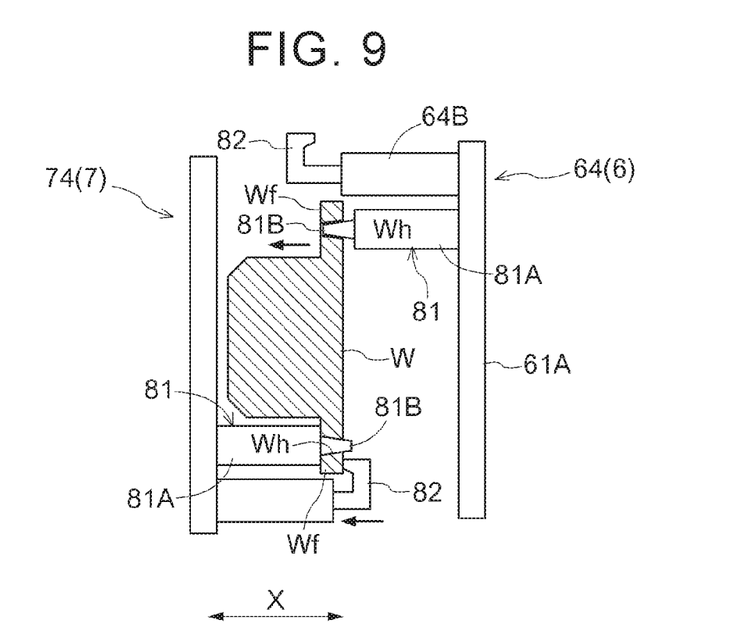
FIG. 9 is a schematic diagram illustrating one phase during the transfer of the object.

As illustrated in FIG. 8, the second clamp mechanism 7 temporarily holds the object W by bringing the second clamp mechanism 7 into the semi-clamping state (#25). To bring the second clamp mechanism 7 into the semi-clamping state, it is only necessary that the claw sliding mechanism 83 supply the second fluid chamber R2 with a fluid having a pressure at such a level that the movable claw 82 does not reach the lock position PL (see FIG. 5). When the semi-clamping state of the second clamp mechanism 7 is detected by the first sensor S1 of the second clamp mechanism 7, the detection information is transmitted to the control portion configured to control the overall operation of the machining apparatus 1.

The first clamp mechanism 6 determines whether the first sensor S1 of the second clamp mechanism 7 is ON (#12). When a positive determination result is obtained (#12: Yes), the first clamp mechanism 6 is brought into the non-clamping state (#13; see FIG. 8). To bring the first clamp mechanism 6 into the non-clamping state, it is only necessary that the claw sliding mechanism 83 supply the first fluid chamber R1 with a fluid having a pressure greater than the mechanical holding force of the locking mechanism 84 (see FIG. 3). When the non-clamping state of the first clamp mechanism 6 is detected by the third sensor S3 of the first clamp mechanism 6, the detection information is transmitted to the control portion.

The second clamp mechanism 7 determines whether the third sensor S3 of the first clamp mechanism 6 is ON (#26). When a positive determination result is obtained (#26: Yes), the second clamp mechanism 7 is brought into the fully clamping state (#27; see FIG. 8). To bring the second clamp mechanism 7 into the fully clamping state, it is only necessary that the claw sliding mechanism 83 supply the second fluid chamber R2 with a fluid having a pressure at such a level that the movable claw 82 can sufficiently reach the lock position PL (see FIG. 4). When the fully clamping state of the second clamp mechanism 7 is detected by the second sensor S2 of the second clamp mechanism 7, the detection information is transmitted to the control portion.

Figure 10:
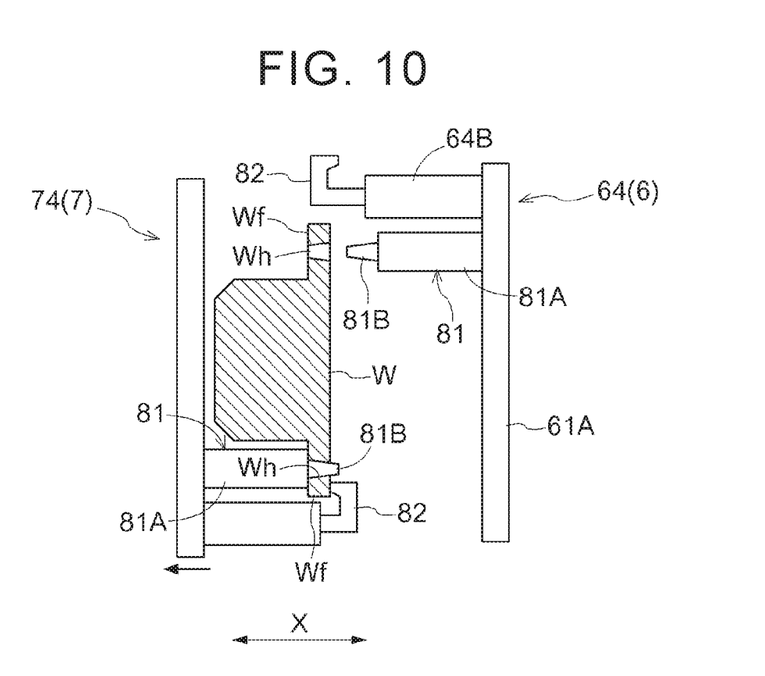
FIG. 10 is a schematic diagram illustrating one phase during the transfer of the object.

The first clamp mechanism 6 determines whether the second sensor S2 of the second clamp mechanism 7 is ON (#14). When a positive determination result is obtained (#14: Yes), the first clamp mechanism 6 moves from the transfer position under the assumption that the delivery of the object W to the second clamp mechanism 7 is completed (#15). For example, the first clamp mechanism 6 may be configured to subsequently move to an opposite side in the X-axis direction and receive a new object W to be subjected to the first machining next. The second clamp mechanism 7 that is holding the received object W moves to a machining position of the second machining mechanism 3 (#28). In this example, the second clamp mechanism 7 is moved to the machining position by being moved away from the first clamp mechanism 6 (see FIG. 10) while the third sensor S3 of the first clamp mechanism 6 detects the non-clamping state and the second sensor S2 of the second clamp mechanism 7 detects the fully clamping state.

Thus, when the conveyance apparatus 5 of this embodiment delivers the object W from the first clamp mechanism 6 to the second clamp mechanism 7, the second clamp mechanism 7 is brought into the semi-clamping state to temporarily hold the object W from a condition that the first clamp mechanism 6 is holding the object W in the fully clamping state and the second clamp mechanism 7 is in the non-clamping state, and then the first clamp mechanism 6 is brought into the non-clamping state and the second clamp mechanism 7 is brought into the fully clamping state. Therefore, even if the second clamp mechanism 7 moves away from the first clamp mechanism 6 before the first clamp mechanism 6 terminates the state in which the object W is held, the second clamp mechanism 7 only terminates the temporary holding of the object W, and the object W is not pulled to both sides in the X-axis direction. Thus, damage to the object W can be reduced.

Particularly in this embodiment, the object W is a non-cylindrical member such as the case of the vehicle drive apparatus, and is transferred while the two clamp mechanisms 6 and 7 are clamping and holding the flange portions Wf provided on the object W from both sides in the X-axis direction. Even in this case, a situation in which the object W is pulled to both sides in the X-axis direction while the two clamp mechanisms 6 and 7 are firmly holding the flange portions Wf of the object W is avoided. Thus, damage to the object W (for example, partial loss of the flange portions Wf) can be reduced. Alternatively, damage to the mechanism on the conveyance apparatus 5 side (for example, detachment of the movable claw 82 or plastic deformation of the clamp portion 64 or 74) can be reduced, for example, if the object W has high rigidity.

Other Embodiments (1) In the embodiment described above, description is given of the exemplary structure in which each of the clamp mechanisms 6 and 7 includes the sensors S1 to S3. However, the present embodiment is not limited to this structure. The sensors S1 to S3 need not be provided in each of the clamp mechanisms 6 and 7. In this case, it is appropriate that a subsequent operation be started with such a trigger that a predetermined time elapses from the start of a certain operation.

(2) In the embodiment described above, description is given of the exemplary structure in which each of the clamp mechanisms 6 and 7 includes the locking mechanism 84 and is brought into the fully clamping state when the locking mechanism 84 is in the actuated state (locked state). However, the present embodiment is not limited to this structure. The locking mechanism 84 need not be provided in each of the clamp mechanisms 6 and 7. In this case, the fully clamping state is achieved only by the fluid pressure supplied to the second fluid chamber R2.

(3) In the embodiment described above, description is given of the exemplary structure in which the support claw 81 of each of the clamp mechanisms 6 and 7 has the protruding pin 81B. However, the present embodiment is not limited to this structure. For example, the protruding pin 81B need not be provided on the support claw 81 if the hole Wh is not formed in the object W.

(4) In the embodiment described above, description is given of the exemplary structure in which each of the clamp mechanisms 6 and 7 holds the object by clamping the object in the X-axis direction between the support claw 81 and the movable claw 82. However, the present embodiment is not limited to this structure. Each of the clamp mechanisms 6 and 7 may have three or more movable claws capable of centering the object by radially moving in conjunction with each other, and the object may be held by being retained in radial directions about the C-axis by the plurality of movable claws.

(5) In the embodiment described above, description is given of the exemplary structure in which the machining apparatus 1 including the conveyance apparatus 5 includes the three machining mechanisms that are the first machining mechanism 2, the second machining mechanism 3, and the third machining mechanism 4. However, the present embodiment is not limited to this structure. For example, the machining apparatus 1 may include only the first machining mechanism 2 and the second machining mechanism 3 without the third machining mechanism 4. Alternatively, the machining apparatus 1 may include four or more machining mechanisms. Further, a structure in which a first apparatus including two machining mechanisms (first machining mechanism and second machining mechanism) and the first clamp mechanism 6 and a second apparatus including two machining mechanisms (third machining mechanism and fourth machining mechanism) and the second clamp mechanism 7 are arranged adjacent to each other in the X-axis direction may be provided as an example of the specific structure of the machining apparatus 1. The first apparatus and the second apparatus may be independent apparatuses. In this case, the conveyance apparatus 5 mounted in the machining apparatus 1 is provided separately in each of the first apparatus and the second apparatus. The number of machining mechanisms provided in each of the first apparatus and the second apparatus is not limited to two, but may be one, three, or more independently. Thus, the two clamp mechanisms 6 and 7 that structure the conveyance apparatus 5 may be provided in different apparatuses independent of each other. In this case, each apparatus may include one or a plurality of machining mechanisms.

(6) In the embodiment described above, description is given taking the exemplary conveyance apparatus 5 mounted in the machining apparatus 1. However, the present embodiment is not limited to this structure. The conveyance apparatus 5 may be structured as an apparatus independent of the machining apparatus 1, and may be an apparatus solely configured to convey the object W irrespective of the machining for the object W.

(7) The structures disclosed in the embodiments described above (including the embodiment described above and the other embodiments; the same applies hereinafter) are also applicable in combination with the structures disclosed in the other embodiments without causing any contradiction.

Regarding other structures as well, the embodiments disclosed herein are illustrative in all respects. Thus, modifications may be made as appropriate without departing from the spirit of the disclosure.

Summary of Embodiments

To summarize the above, the conveyance apparatus disclosed herein preferably has the following structures.

The conveyance apparatus (5) conveys the object (W) in the reference direction (X) by transferring the object (W) between the two clamp mechanisms (6, 7) configured to move relative to each other along the reference direction (X).

Each of the clamp mechanisms (6, 7) is configured to freely change its state among the fully clamping state in which the object (W) is held by the tightening force equal to or greater than the set tightening force, the semi-clamping state in which the object (W) is held by the tightening force smaller than the set tightening force, and the non-clamping state in which the object (W) is not held.

When the object (W) is delivered from the first clamp mechanism (6) that is one of the clamp mechanisms to the second clamp mechanism (7) that is the other one of the clamp mechanisms, the second clamp mechanism (7) is brought into the semi-clamping state to temporarily hold the object (W) from the condition that the first clamp mechanism (6) is holding the object (W) in the fully clamping state and the second clamp mechanism (7) is in the non-clamping state, and then the first clamp mechanism (6) is brought into the non-clamping state and the second clamp mechanism (7) is brought into the fully clamping state.

According to this structure, each of the clamp mechanisms (6, 7) is configured to freely change its state among the three states including the semi-clamping state as well as the fully clamping state and the non-clamping state. By using the semi-clamping state, when the object (W) is transferred between the two clamp mechanisms (6, 7), the second clamp mechanism (7) is brought into the semi-clamping state to temporarily hold the object (W) before the second clamp mechanism (7) is brought into the fully clamping state to fully hold the object (W). Therefore, even if the second clamp mechanism (7) moves away from the first clamp mechanism (6) before the first clamp mechanism (6) terminates the state in which the object (W) is held, the second clamp mechanism (7) only terminates the temporary holding of the object (W), and the object (W) is not pulled in both directions. Thus, the damage to the object (W) can be reduced. Then, the first clamp mechanism (6) is brought into the non-clamping state to terminate the holding, and the second clamp mechanism (7) is brought into the fully clamping state to fully hold the object (W). Thus, the object (W) can firmly be held by the second clamp mechanism (7).

As one aspect, the following structure is preferable.

The second clamp mechanism (7) includes the first sensor (S1) configured to detect the semi-clamping state.

According to this structure, it is possible to appropriately determine a timing to bring the first clamp mechanism (6) into the non-clamping state to terminate the holding after the second clamp mechanism (7) temporarily holds the object (W). Thus, it is possible to avoid a situation in which the first clamp mechanism (6) terminates the holding while the second clamp mechanism (7) temporarily holds the object (W) insufficiently, and therefore avoid a situation in which the object (W) falls due to failure in the transfer. In this respect as well, the damage to the object (W) can be reduced.

As one aspect, the following structure is preferable.

Each of the first clamp mechanism (6) and the second clamp mechanism (7) includes the second sensor (S2) configured to detect the fully clamping state, and the third sensor (S3) configured to detect the non-clamping state.

The first clamp mechanism (6) and the second clamp mechanism (7) are moved closer to or away from each other under a condition that the second sensor (S2) of one of the first clamp mechanism (6) and the second clamp mechanism (7) detects the fully clamping state and the third sensor (S3) of the other one of the first clamp mechanism (6) and the second clamp mechanism (7) detects the non-clamping state.

According to this structure, it is possible to appropriately determine whether the two clamp mechanisms (6, 7) can be moved closer to or away from each other based on combinations of pieces of detection information from the second sensor (S2) and the third sensor (S3) of the first clamp mechanism (6) and the second clamp mechanism (7). The two clamp mechanisms (6, 7) are prevented from moving closer to or away from each other while firmly and fully holding the object (W) simultaneously. Thus, it is possible to appropriately avoid a situation in which the object (W) is damaged by being pulled in both directions.

As one aspect, the following structure is preferable.

Each of the clamp mechanisms (6, 7) includes the support claw (81) configured to support the object (W), the movable claw (82) configured to clamp the object (W) between the support claw (81) and the movable claw (82), the urging mechanism (83) configured to urge the movable claw (82) to the clamping side, and the locking mechanism (84) configured to prevent the movement of the movable claw (82) to the release side. The semi-clamping state is achieved such that the urging mechanism (83) is actuated while the locking mechanism (84) is not actuated. The fully clamping state is achieved such that the locking mechanism (84) is actuated while the movable claw (82) moves to the predetermined lock position (PL) through the actuation of the urging mechanism (83).

According to this structure, even if the object (W) is formed into a non-columnar irregular shape, each of the clamp mechanisms (6, 7) can appropriately hold the object (W) by clamping the object (W) with the set of the support claw (81) and the movable claw (82). Further, the state can appropriately be changed between the semi-clamping state and the fully clamping state in cooperation between the urging mechanism (83) and the locking mechanism (84) provided in each of the clamp mechanisms (6, 7).

As one aspect, the following structure is preferable.

The support claw (81) has the protruding pin (81B) to be inserted into the hole (Wh) formed in the object (W).

According to this structure, the object (W) can appropriately be positioned relative to each of the clamp mechanisms (6, 7) while the protruding pin (81B) of the support claw (81) is inserted into the hole (Wh) of the object (W). Thus, the portion of the object (W) to be held can appropriately be clamped between the support claw (81) and the movable claw (82), and therefore the object (W) can firmly be held by each of the clamp mechanisms (6, 7) without causing a backlash.

The conveyance apparatus disclosed herein suffices if at least one of the effects described above can be attained.

DESCRIPTION OF THE REFERENCE NUMERALS 5 conveyance apparatus
6 first clamp mechanism (clamp mechanism)
7 second clamp mechanism (clamp mechanism)

81 support claw
81B protruding pin
82 movable claw
83 claw sliding mechanism (urging mechanism)
84 locking mechanism
S1 first sensor
S2 second sensor
S3 third sensor
W object
Wh hole
PL lock position
X X-axis direction (reference direction)

The invention claimed is:

1. A conveyance apparatus configured to convey an object in a reference direction by transferring the object between two clamp mechanisms configured to move relative to each other along the reference direction, wherein
    each of the clamp mechanisms is configured to freely change its state among a fully clamping state in which the object is held by a tightening force equal to or greater than a set tightening force, a semi-clamping state in which the object is held by a tightening force smaller than the set tightening force, and a non-clamping state in which the object is not held,
    each of the clamp mechanisms includes a support claw configured to support the object, a movable claw configured to clamp the object between the support claw and the movable claw, an urging mechanism configured to urge the movable claw to a clamping side, and a locking mechanism configured to prevent movement of the movable claw to a release side, the semi-clamping state is achieved such that the urging mechanism is actuated while the locking mechanism is not actuated, and the fully clamping state is achieved such that the locking mechanism is actuated while the movable claw moves to a predetermined lock position through actuation of the urging mechanism,
    the support claw has a protruding pin to be inserted into a hole formed in the object, and
    when the object is delivered from a first clamp mechanism that is one of the clamp mechanisms to a second clamp mechanism that is the other one of the clamp mechanisms, the second clamp mechanism is brought into the semi-clamping state to temporarily hold the object with the protruding pin of the second clamp mechanism inserted into the hole of the object from a condition that the first clamp mechanism is holding the object in the fully clamping state with the protruding pin of the first clamp mechanism inserted into the hole of the object and the second clamp mechanism is in the non-clamping state, and then the first clamp mechanism is brought into the non-clamping state and the second clamp mechanism is brought into the fully clamping state.

2. The conveyance apparatus according to claim 1, wherein the second clamp mechanism includes a first sensor configured to detect the semi-clamping state.

3. The conveyance apparatus according to claim 1, wherein
    each of the first clamp mechanism and the second clamp mechanism includes a second sensor configured to detect the fully clamping state, and a third sensor configured to detect the non-clamping state, and
    the first clamp mechanism and the second clamp mechanism are moved closer to or away from each other under a condition that the second sensor of one of the first clamp mechanism and the second clamp mechanism detects the fully clamping state and the third sensor of the other one of the first clamp mechanism and the second clamp mechanism detects the non-clamping state.

4. The conveyance apparatus according to claim 1, wherein the movable claw is pivotable at a position adjacent to the support claw and is switchable between a overlapping state with the support claw and a non-overlapping state with the support claw, as viewed from the direction of the pivot axis of the movable claw, and
    the clamp mechanism is in the non-clamping state with the movable claw in the non-overlapping state when the force mechanism is inactivated, is in the semi-clamping state with the movable claw in an overlapping state when the urging mechanism is activated and the lock mechanism is inactivated, and is in the fully clamping state with the movable claw in the overlapping state when the locking mechanism is activated when the movable claw is moved to the predetermined locked position by the actuation of the urging mechanism.

5. The conveyance apparatus according to claim 1, wherein the force mechanism has a cylinder, a piston that can slide inside the cylinder, and a piston rod to which the movable jaw claw is fixed at the tip and to which the piston is fixed inside the cylinder,
    the piston rod has a large-diameter portion formed larger than the other portion of the piston rod at the end opposite to the side to which the movable claw is fixed, and
    the locking mechanism has a locking piece which is urged against the piston rod in a radial direction of the piston rod, and prevents movement of the movable claw to the release side when a distal end of the locking piece is engaged with a recessed corner between the piston rod and the large-diameter portion of the piston rod.

* * * * *